Figures 1, 2:
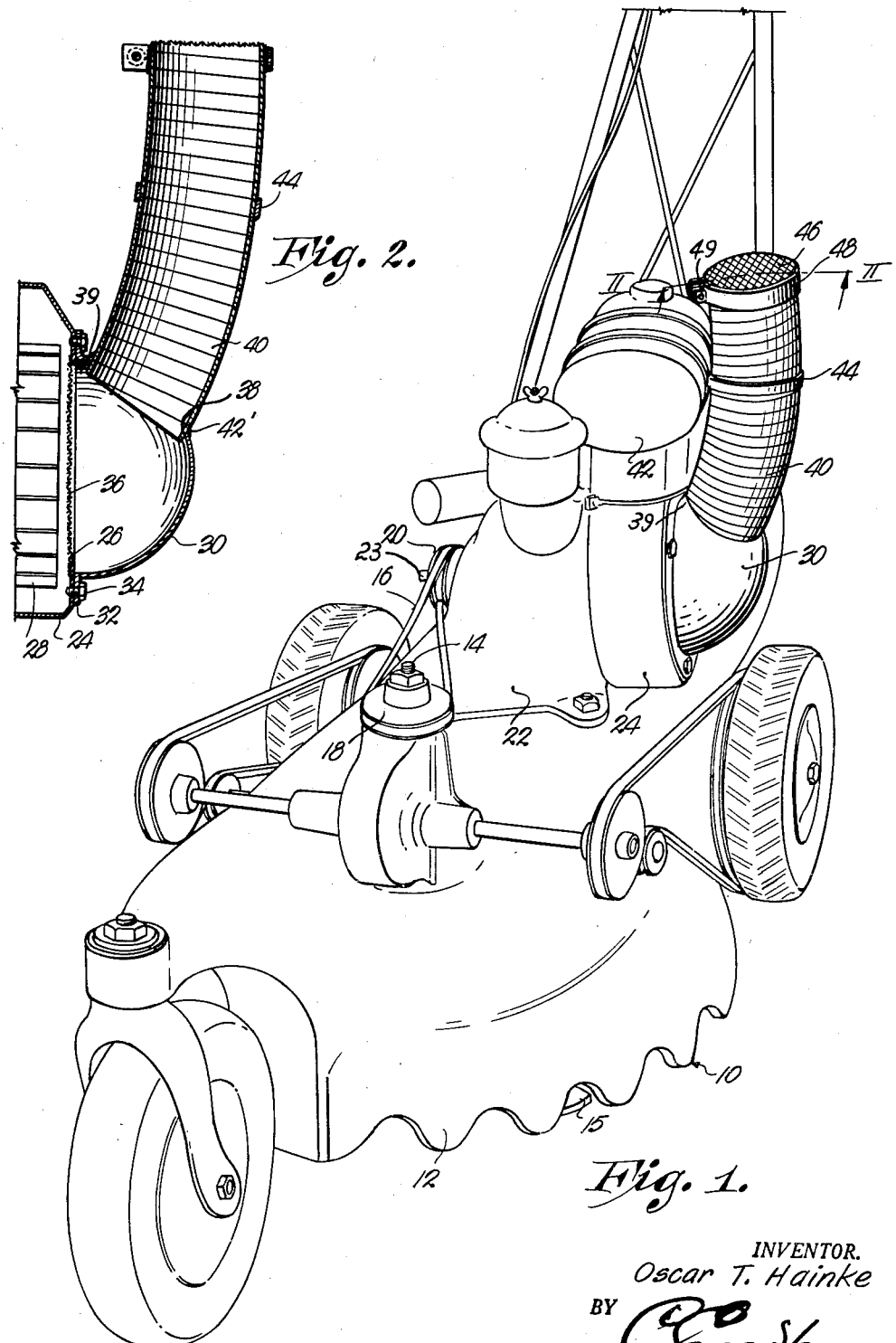

July 17, 1956 — O. T. HAINKE — 2,754,809
DUST PROTECTOR FOR INTERNAL COMBUSTION ENGINES
Filed June 8, 1953

INVENTOR.
Oscar T. Hainke
BY
ATTORNEY.

United States Patent Office 2,754,809
Patented July 17, 1956

2,754,809
DUST PROTECTOR FOR INTERNAL COMBUSTION ENGINES

Oscar T. Hainke, Enid, Okla.

Application June 8, 1953, Serial No. 360,208

1 Claim. (Cl. 123—41.65)

This invention relates to improvements in power lawn mowers and has for its primary aim to provide simple, inexpensive means universally adapted for various types of internal combustion engines to eliminate damage to the prime mover caused by dust emanating from the grass cuttings disbursed by the mower laterally and outwardly from beneath the mobile platform thereof.

Power lawn mowers of the kind having a substantially horizontal mobile platform with a rotary cutting blade mounted therebeneath are well known. These mowers are normally driven by an internal combustion engine mounted on the platform. The engines, in turn, are air-cooled through use of a fan or blower operably connected to the crank shaft thereof. Manifestly, an air inlet is provided adjacent the in-take blower. Such air inlet is necessarily disposed adjacent the platform and is usually within the area of dust that rises from the grass cuttings being dispersed from beneath the platform of the mower by the cutter blade itself. Dust entering the engine is extremely detrimental and soon causes the working parts of the engine to become worn, clogged and gummed. The engines are not long lasting and this harassing problem results in a tremendous expense to the owner of this type. It is, accordingly, a most important object of the present invention to provide a dome-like member adapted for fastening to the engine in covering relationship to the air inlet opening thereof and having an elongated tube extending therefrom to a point well above the dust area so that substantially clean air is drawn into the engine by the blower thereof.

Other objects include the way in which the aforesaid tube is of a flexible nature so as to clear the component parts of the lawn mower, the manner of clamping the tube to the mower or engine parts, and the way in which a screen cap is provided on the tube and a secondary screen is mounted across the air inlet opening, and other details of construction to be made clear as the following specification progresses.

In the drawing:

Figure 1 is a perspective view of a lawn mower provided with a dust protector for the prime mover made pursuant to the present invention; and Fig. 2 is an enlarged fragmentary cross-sectional view taken on line II—II of Fig. 1.

The power lawn mower, chosen for illustration in Fig. 1 of the drawing, is broadly designated by the numeral 10 and includes a mobile platform 12 having a rotary cutter blade 15 therebelow and mounted on a vertical spindle 14 that extends above platform 12. The spindle 14 is driven by an endless belt 16 trained around pulleys 18 and 20 on spindle 14 and on the drive shaft 23 of an internal combustion engine 22 respectively. Engine 22 is mounted directly upon the platform 12 and conventionally provided with a housing 24 having an air inlet opening 26. Engine 22 is cooled by means of a fan or blower 28 operably coupled with the drive shaft 23 of engine 22 and adapted to draw air into the engine through the air inlet port 26.

The problem which the present invention is designed to overcome lies in the extreme damage to the engine 22 caused by dust that is carried thereinto through the opening 26 by fan 28. This problem is enhanced by virtue of the fact that the inlet opening 26 is disposed within the zone of maximum dust emanation from the grass cuttings that are dispersed from beneath the platform 12 by the blade 15.

Accordingly, the inlet opening 26 is completely covered by a hollow, dome-shaped member 30 that is substantially semi-spherical and having an annular out-turned flange 32 that rests directly and flatly against the housing 24 in surrounding relationship to the port 26. A number of bolts, or the like, 34 passing through the flange 32 connect the member 30 to the housing 34. A screen 36, secured to the housing 24, covers the air inlet port 26.

The dome-shaped member 30 has a hole 38 therein adjacent the top 39 thereof and into which extends an elongated, flexible tube 40. Tube 40 is attached to the member 30 in any suitable manner, such as by welding 42'. By virtue of its flexibility, tube 40 may extend upwardly from the member 30, clearing the component parts of the engine 22 and, particularly, the fuel supply tank 42 thereof.

A strap 44 around the tube 40 serves as a means of attachment of the tube 40 to the fuel supply tank 42. A screen cap 46 covers the uppermost end of the tube 40 and is held in place by means of a strap 48 clamped about the tube 40 by bolt and nut structure 49.

Through the medium of the hollow, dome-shaped member 30 and the flexible tube 40 substantially clean air is drawn into the engine 22 by the blower 28. The inlet end of the tube 40 is directed upwardly and disposed well above the aforementioned zone of high, dense dust dispersement. Such particles of foreign material including grass clippings and pieces of dirt and the like as may still tend to gather above the tube 40 will be further removed from the in-flowing air by the screens 36 and 46. However, by virtue of the upwardly facing disposition of the tube 40, as distinguished from the lateral of side opening of the port 26, very little dust is drawn into the engine 22 in normal operating conditions.

It is seen that the assembly is universally adaptable for attachment to many types of engines and can be quickly and easily attached without the necessity of modifying the engine itself.

Having thus described the invention what is claimed as new and desired to be secured by Letters Patent is:

In combination with an internal combustion engine having a normally horizontal drive shaft, a housing provided with an air inlet opening in one side thereof, a blower in the housing secured to the shaft for drawing air into the housing through said opening during rotation of the shaft, and a fuel tank mounted on the housing thereabove, a dust protector comprising a hollow, semi-spherical member disposed in covering relationship to said opening and provided with an annular, outturned flange bearing against the outer face of said one side of the housing; a plurality of fasteners passing through said flange and attaching the member to said one side of the housing, said member having an upwardly facing hole adjacent the top thereof; an elongated, flexible tube extending upwardly from the member alongside the fuel tank and having an uppermost and a lowermost open end, said lowermost end of the tube being telescoped in said hole; means attaching the tube to the member around said hole in sealed relationship thereto; a first strap around said tube intermediate the ends thereof attaching the same to the fuel tank; a horizontal screen cap covering said uppermost open end of the tube; a second strap surrounding the tube adjacent said uppermost end thereof for holding the screen cap in place; and bolt and nut structure clamping the second strap to the tube.

References Cited in the file of this patent

UNITED STATES PATENTS

| | | |
|---|---|---|
| 2,172,992 | Stegeman | Sept. 12, 1939 |
| 2,504,416 | Hileman | Apr. 18, 1950 |